Feb. 8, 1944.  L. E. NORTON  2,341,232
NINETY DEGREE PHASE SHIFTER
Filed Sept. 30, 1942
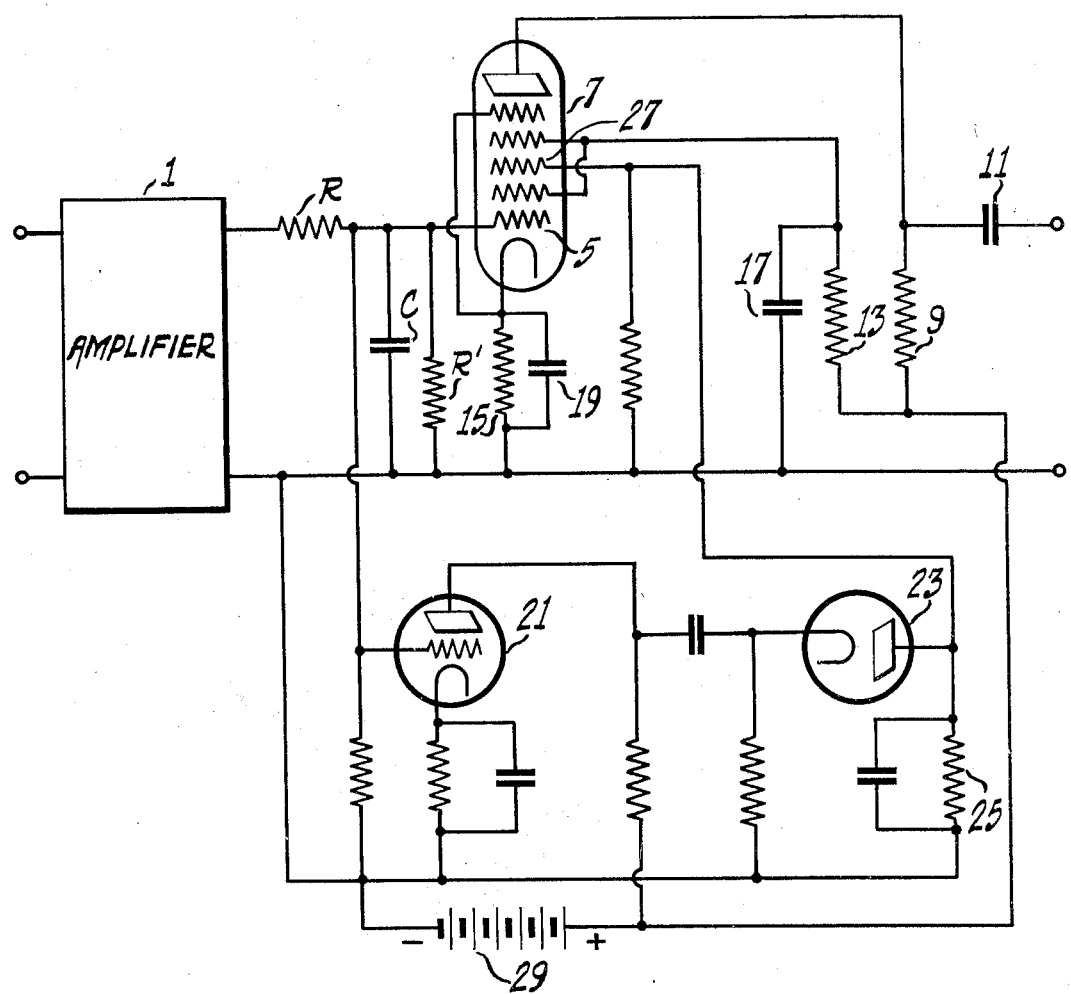
Inventor
*Lowell E. Norton*
By
*C. D. Tuska*
Attorney Patented Feb. 8, 1944

2,341,232

UNITED STATES PATENT OFFICE 2,341,232

NINETY DEGREE PHASE SHIFTER

Lowell E. Norton, Collingswood, N. J., assignor to Radio Corporation of America, a corporation of Delaware Application September 30, 1942, Serial No. 460,300

3 Claims. (Cl. 172—238)

This invention relates to a ninety degree phase shifter for a band of frequencies, and has for its principal object the provision of a system for shifting the phase of an applied voltage without substantial variation in phase shift or amplitude in response to changes in the frequency of the input. Such a device finds many applications, for example, in producing a two phase deflection voltage for circular scanning with a cathode ray tube.

The drawing shows a schematic circuit diagram of the invention. An amplifier 1 is provided to compensate for the attenuation introduced by the phase shifter. The output circuit of the amplifier is connected through a resistor R to the inner control grid 5 of a multigrid mixer type tube 7, which may be, for example, a type 6L7. A high resistance grid leak R' is connected to the grid 5 and is shunted by a capacitor C. The output of the tube 7 includes a load resistor 9 and a blocking capacitor 11. Resistors 13 and 15, shunted by by-pass capacitors 17 and 19, respectively, are arranged to provide screen and cathode potentials for the tube 7.

An amplifier tube 21 is provided with its input circuit in parallel with that of the tube 7 and its output connected to a rectifier 23. The rectifier load resistor 25 is connected to the outer control grid 27 of the tube 7. The circuit is arranged to supply to the grid 27 a negative bias, varying in magnitude with variations in the amplitude of the input to the rectifier 23. The necessary direct current potentials for the tubes 7 and 21 are supplied by a source 29.

The ohmic values of the resistors R and R' are made very high as compared to the reactance of the capacitor C for the band of frequencies over which the device is to operate. The grids of the tubes 7 and 21 are maintained negative with respect to their cathodes, so that the loading effect on the capacitor C is slight. Assuming the output voltage of the amplifier 1 to be E, the voltage $e$ applied to the grids of the tubes 7 and 21 is $$e = E \frac{1/j\omega C}{R + 1/j\omega C} = \frac{E}{1 + jR\omega C} = \frac{E(1 - jR\omega C)}{1 + R^2\omega^2 C^2}$$

where $\omega = 2\pi$ times the frequency.

Let $$\frac{R}{1/\omega C} = A$$

Then $$e = E \frac{1 - jA}{1 + A^2}$$

The band of frequencies for which the circuit acts as a 90 degree phase shifter lies between some frequency $f'$ and some higher frequency $f''$. If $$R \gg \frac{1}{2\pi f' C}$$

at the lower frequency $f'$, then $A \gg 1$ and $e = -je/A$.

For $f$, any frequency between $f'$ and $f''$, since $$A = 2\pi f R C, \quad e = -j \frac{E}{2\pi f R C}$$

Thus the voltage $e$ lags the voltage E by substantially 90 degrees over the range $f'$ to $f''$, but changes in magnitude inversely as the frequency.

The variable magnitude voltage $e$ which may be variable in frequency, but which should be a potential having only one frequency at any one instant, is amplified by the tube 21 and rectified by the tube 23, providing a unidirectional voltage which follows the envelope of the voltage $e$. Approximately the same action follows if potentials of several different frequencies are applied simultaneously, provided the frequency difference is small. This rectified voltage is applied to the grid 27 of the tube 7, controlling the gain so that the amplitude of the output voltage across the load 9 is independent of frequency. The output voltage magnitude varies only with variations in the input voltage E, and the phase of the output voltage is 90 degrees with respect to E over the range $f'$ to $f''$.

Thus the invention has been described as a circuit for producing quadrature voltage over a band of frequencies. An input voltage is applied through a high resistance to a relatively low reactance capacitor; the voltage across the capacitor is then substantially 90 degrees out of phase with the input but varies in magnitude with frequency. A variable gain amplifier is provided with a parallel channel including a rectifier arranged to compensate the frequency characteristic of the phase-shift circuit and provide an output voltage which is independent of the frequency.

I claim as my invention:

1. A phase shifting device comprising a capacitor connected in series with a resistor and having a relatively low reactance over the range of frequencies through which the device is to operate, a variable gain amplifier having its input circuit connected across said capacitor, and a control circuit including an amplifier and a rectifier arranged to vary the gain of said variable gain amplifier inversely in response to the voltage across said capacitor.

2. A phase shifter comprising an amplifier, a resistor and a capacitor connected in series across the output circuit of said amplifier, a second amplifier with its input circuit connected across said capacitor, and means for varying the gain of said second amplifier inversely as the voltage across said capacitor.

3. A phase shifter including a resistor and a capacitor connected so as to produce a phase shift of substantially 90 degrees over a range of frequencies and a variation of amplitude as a function of frequency over said range, a variable gain amplifier connected to said capacitor, and a control circuit for said amplifier arranged to vary the gain thereof in response to the voltage across said capacitor.

LOWELL E. NORTON.